United States Patent
Peters et al.

(10) Patent No.: US 9,500,317 B2
(45) Date of Patent: Nov. 22, 2016

(54) LUBRICANT GUN WITH EXTERNAL COMMUNICATION

(71) Applicants: Terry Clarence Peters, Concord, NC (US); Jose Americo Francisco dos Santos, Fort Mill, SC (US)

(72) Inventors: Terry Clarence Peters, Concord, NC (US); Jose Americo Francisco dos Santos, Fort Mill, SC (US)

(73) Assignee: AKTIEBOLAGET SKF, Gothenburg (SE)

( * ) Notice: Subject to any disclaimer, the term of this patent is extended or adjusted under 35 U.S.C. 154(b) by 14 days.

(21) Appl. No.: 14/565,499

(22) Filed: Dec. 10, 2014

(65) Prior Publication Data

US 2016/0169446 A1    Jun. 16, 2016

(51) Int. Cl.
  *F16N 3/12*    (2006.01)
  *H04B 5/00*    (2006.01)
  *F16N 11/08*   (2006.01)
  *F16N 27/00*   (2006.01)
  *H02P 7/08*    (2006.01)

(52) U.S. Cl.
  CPC ............. *F16N 3/12* (2013.01); *H04B 5/0062* (2013.01); *F16N 11/08* (2013.01); *F16N 27/00* (2013.01); *H02P 7/08* (2013.01)

(58) Field of Classification Search
  CPC ............ F16N 27/00; F16N 3/12; F16N 11/08; H04B 55/0062; H04B 5/0062; H02P 7/08
  See application file for complete search history.

(56) References Cited

U.S. PATENT DOCUMENTS

| | | | | |
|---|---|---|---|---|
| 5,350,040 A * | 9/1994 | Gribble | ................... | F16N 21/00 184/105.2 |
| 5,404,967 A * | 4/1995 | Barry | ........................ | F16N 3/12 184/105.1 |
| 5,878,842 A * | 3/1999 | Rake | ....................... | F16N 29/02 184/108 |
| 6,050,450 A * | 4/2000 | Gardos | ................. | B01L 3/0227 222/1 |
| 6,575,331 B1 * | 6/2003 | Peeler | ................... | G01F 11/029 222/1 |
| 6,938,455 B2 * | 9/2005 | Yakura | .................... | F16N 29/04 184/108 |
| 7,617,850 B1 * | 11/2009 | Dorney | ................ | B67D 1/0888 141/104 |
| 7,984,694 B2 * | 7/2011 | Wu | ....................... | A01K 5/0114 119/51.02 |
| 8,042,712 B2 * | 10/2011 | Hemsen | .............. | B05C 11/1002 222/334 |
| 8,528,782 B2 * | 9/2013 | Mergener | ................. | F16N 3/12 222/1 |

(Continued)

*Primary Examiner* — Frederick C Nicolas
(74) *Attorney, Agent, or Firm* — Mark Ussai; SKF USA Inc. Patent Dept.

(57) ABSTRACT

An apparatus for dispensing a lubricant. The apparatus includes a chamber having an inlet through which the lubricant is received and an outlet through which the lubricant is ejected. A controller is in communication with the chamber. A communication module is in communication with the controller. The communication module is configured to transmit first information to an external device, to receive second information from the external device, or both.

18 Claims, 4 Drawing Sheets

(56) References Cited

U.S. PATENT DOCUMENTS

| | | | | |
|---|---|---|---|---|
| 8,915,331 B2* | 12/2014 | Alekseyev | ................ | H02P 7/08 184/105.2 |
| 2013/0081903 A1* | 4/2013 | Alekseyev | ................ | H02P 7/08 184/26 |
| 2013/0119081 A1* | 5/2013 | Mergener | .................. | F16N 3/12 222/1 |
| 2015/0114991 A1* | 4/2015 | Alekseyev | .............. | F16N 11/08 222/63 |

* cited by examiner

LUBRICANT GUN WITH EXTERNAL COMMUNICATION

BACKGROUND

A grease gun is used to deliver lubrication in a variety of mechanical settings, including for lubricating bearings. The grease gun generally includes a piston that draws in grease from a cartridge into a priming chamber during an upstroke, and expels the grease from the chamber during a downstroke. The grease gun also includes a display (e.g., an LCD screen) configured to show information related to the use of the grease gun. This information may include the amount of grease still available in the cartridge and/or priming chamber, the amount of grease ejected from the grease gun during a set time interval, and the like.

This information is only available on the display of the grease gun. As such, anyone who desires to analyze such information must be handling the grease gun. What is needed, therefore, is an improved system and method for providing information related to a grease gun.

SUMMARY

An apparatus for dispensing a lubricant is disclosed. The apparatus includes a chamber having an inlet through which the lubricant is received and an outlet through which the lubricant is ejected. A controller is in communication with the chamber. A communication module is in communication with the controller. The communication module is configured to transmit first information to an external device, to receive second information from the external device, or both.

A system for dispensing a lubricant is also disclosed. The system includes a dispenser including a chamber having an inlet through which the lubricant is received and an outlet through which the lubricant is ejected. A piston is movably positioned in the chamber. A motor is coupled with the piston and configured to move the piston in the chamber. A controller is in communication with the motor. A communication module is in communication with the controller. A first external device is configured to transmit first information to the communication module. A second external device is configured to transmit second information to the communication module, receive the second information from the communication module, or both.

A method for dispensing a lubricant is also disclosed. The method includes receiving first information at a communication module of a dispenser from a first external device. The dispenser includes a chamber having an inlet through which the lubricant is received and an outlet through which the lubricant is ejected. A piston is movably positioned in the chamber. A motor is coupled with the piston and configured to move the piston in the chamber. A controller is in communication with the motor and the communication module. The lubricant is dispensed from the dispenser to a lubrication point on a bearing.

BRIEF DESCRIPTION OF THE DRAWINGS

The accompanying drawings, which are incorporated in and constitute a part of this specification, illustrate an embodiment of the present teachings and together with the description, serve to explain the principles of the present teachings. In the figures.

Figure 1:
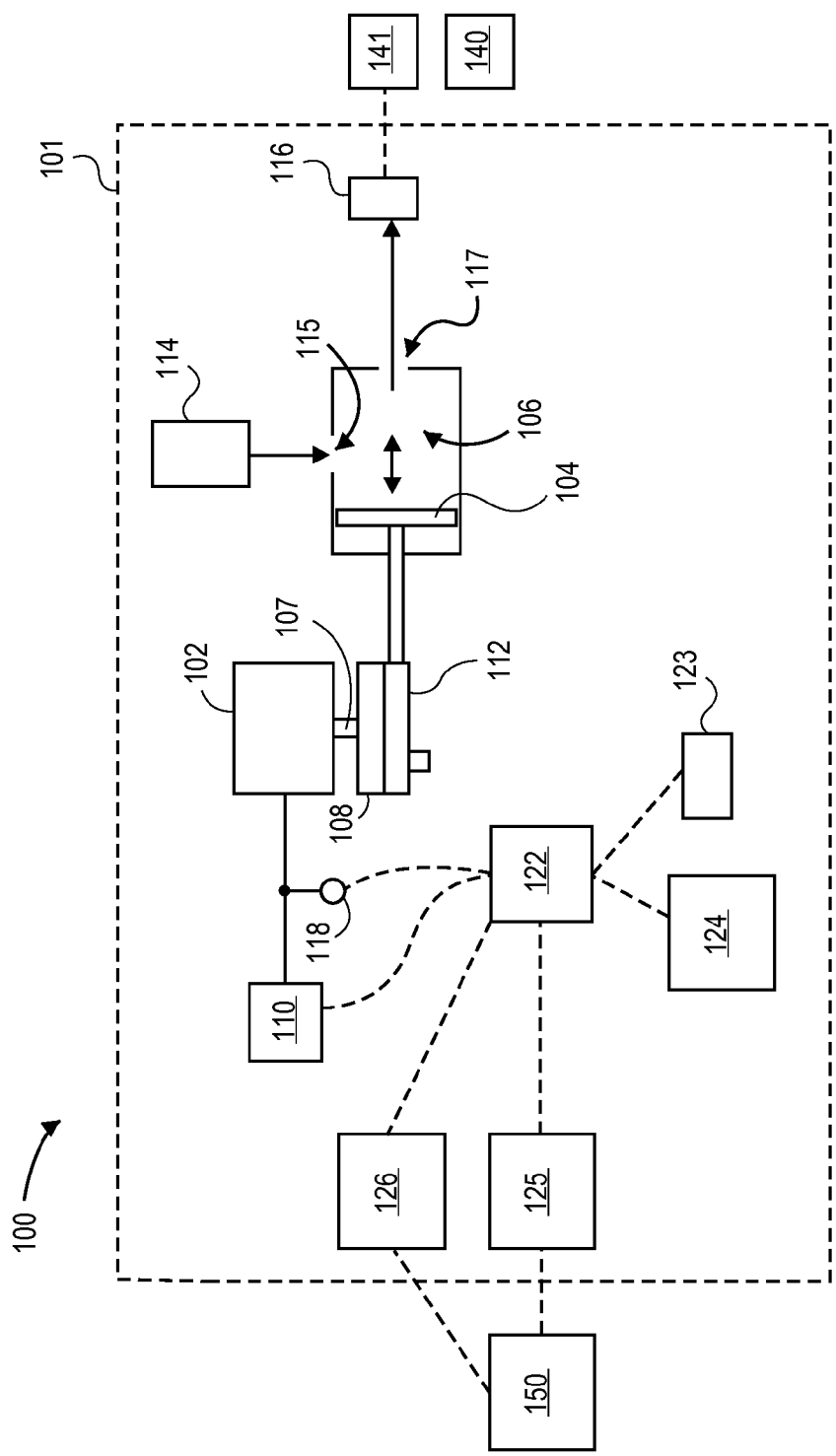
FIG. 1 illustrates a schematic view of a system including a dispenser and an external device, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

Further, notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

Additionally, when referring to a position or direction in a well, the terms "above," "up," "upward," "ascend," and various grammatical equivalents thereof may be used to refer to a position in a well that is closer to the surface than another position, or a movement or direction proceeding toward the surface (topside), without regard as to whether the well is vertical, deviated, or horizontal. Similarly, when referring to a position in a well, the terms "below," "down," "downward," and "descend" and various grammatical equivalents thereof may be used to refer to a position in a well that is farther from the surface than another position, or a direction or movement proceeding away from the surface, regardless of whether the well is vertical, deviated, or horizontal. Moreover, the terms "upper," "lower," "above," and "below," when referring to components of an apparatus, are used to conveniently refer to the relative positioning of components or elements, e.g., as illustrated in the drawings, and may not refer to any particular frame of reference. Thus, a component may be flipped or viewed in any direction, while parts thereof may remain unchanged in terms of being "upper" or "lower" etc.

FIG. 1 illustrates a schematic view of a system 100 including a dispenser 101 and one or more external devices 140, 150, according to an embodiment. The dispenser 101 may be configured to dispense a fluid, such as a lubricant, a semi-solid lubricant, or the like. For purposes of illustration, the dispenser 101 is described in terms of a lubricant gun, and the lubricant is grease; however, it will be appreciated that the dispenser 101 may be configured for delivery of other lubricants (e.g., oil), fluids, etc., for lubrication or other purposes.

As shown, the dispenser 101 may include a motor 102 that drives a piston 104 in a priming chamber 106. For example, the motor 102 may rotate a linkage 108 (e.g., via a shaft 107 and/or one or more gears). The motor 102 may be any suitable type of motor, for example, an AC or DC electric motor of any suitable size. Further, the motor 102 may be powered by a power supply 110, which may be a battery (e.g., 18V). The battery may enable the dispenser 101 to be cordless. In other embodiments, the power supply 110 may be a generator, a power grid, or any other source of electricity.

The linkage 108 may include or be coupled with a yoke 112 that translates the rotary motion of the shaft 107 into reciprocating motion in the piston 104. The yoke 112 may be any suitable structure, such as a cam, crank, rack and pinion, etc. Further, the yoke 112 may be configured to apply bi-directional force on the piston 104, such that the piston 104 is moved up and down in the priming chamber 106. It will be appreciated that "up" and "down" as the terms are used herein to describe the movement of the piston 104, refer to the relative position of the piston 104 in the priming chamber 106. For example, as the piston 104 moves "up" (i.e., "upstroke"), a volume in the chamber 106 that is available for the lubricant is increased, and when the piston 104 moves down ("downstroke"), the volume decreases. Although shown as including a piston 104, in other embodiments, the dispenser 101 may a pneumatic dispenser, a reciprocating dispenser, or the like.

The dispenser 101 may also include a lubricant reservoir 114, which may be a removable lubricant cartridge, a refillable reservoir, or the like. The lubricant reservoir 114 may be in fluid communication with an inlet 115, so as to introduce lubricant to the priming chamber 106 from the lubricant reservoir 114. The dispenser 101 may further include an outlet 117, which may be coupled with a fitting 116, for example, a lubricant fitting, via one or more nozzles, conduits, etc. The inlet 115 and outlet 117 may each include any valves (e.g., check valve, poppet valve, etc.) configured to allow the lubricant to flow in the correct direction, as indicated by the arrows, and prevent the flow from reversing.

The dispenser 101 may further include a sensor 118 configured to take a measurement of a condition related to an amount of force applied to the piston 104. For example, the sensor 118 may be configured to measure an electrical current drawn by the motor 102 to rotate the shaft 107. In an embodiment, a larger current measurement may be associated with a greater force applied to move the piston 104, and thus a greater resistance to moving the piston 104 in the chamber 106. The sensor 118 may be electrically coupled with the power supply 110, the motor 102, or anywhere in a power circuit containing the two. Instead of, or in addition to, the sensor 118, the dispenser 101 may include other sensors configured to measure conditions related to the amount of force applied to the piston 104. For example, a torque sensor may be coupled with the shaft 107 or the linkage 108. The torque sensor may measure an amount of force being applied to the shaft 107 or the linkage 108 to move the piston 104, and may thus perform a similar function to the sensor 118. In other embodiments, any other suitable type of sensor may be employed.

The dispenser 101 may further include a controller 122, which may be coupled with the motor 102, the power supply 110, and/or the sensor 118. The controller 122 may be or include a printed circuit board including one or more microprocessors, programmable logic units, or the like. The controller 122 may also be coupled with a display 124, which may provide graphical indications of the status, performance, error, etc. of the dispenser 101, as will be described in greater detail below. The controller 122 may be coupled with one or more inputs 123 (e.g., switches or buttons) whether physical or integrated into the display 124 (e.g., as a touch screen).

The dispenser 101 may further include a communication module 125. The communication module 125 may be part of, or in communication with, the controller 122. The communication module 125 may be or include an antenna or other device configured to transmit and/or receive signals. The communication module 125 may be configured to communicate with (e.g., transmit signals to and/or receive signals from) one or more external devices (two are shown: 140, 150). The communication module 125 may communicate via a wire or cable, or the communication module 125 may communicate wirelessly via an electromagnetic field, a wireless local area network ("WLAN"), BLUETOOTH, or the like.

In one particular embodiment, the communication module 125 may be or include a radio frequency identification ("RFID") reader, and the first external device 140 may be an RFID tag located proximate to a lubrication point 141. The lubrication point 141 may be, for example, on or proximate to a bearing, a track expansion, a windmill, or the like. The first external device 140 may be powered by electromagnetic induction from magnetic fields produced near the communication module 125, or the first external device 140 may have a battery. The first external device 140 may have information stored thereon that is configured to be transmitted to the communication module 125. The information may be related to the dispenser 101 and/or the lubrication point 141. For example, the information may include the type of lubrication point 141 (e.g., bearing), the type of lubricant to be used at the lubrication point 141, the amount of lubricant to be used at the lubrication point 141, the last time that the lubrication point 141 was serviced, the maximum pressure that the lubrication point 141 can withstand (e.g., to avoid blowing out a seal), certain times that the dispenser 101 is not to be operated (e.g., after 5 PM or before 8 AM), and the like. Once this information is obtained by the communication module 125, the information may be shown on the display 124. In another embodiment, the information may automatically change the settings of the dispenser 101. For example, the settings may be changed to dispense a particular type of lubricant and/or a particular amount of lubricant at the lubrication point 141, to limit the output pressure of the dispenser 101, and the like.

The second external device 150 may be or include a computer, a tablet, a smart phone, or the like. The second external device 150 may include a database and software configured to store, monitor, or manage information related to the performance of the dispenser 101, the inventory of components (e.g., grease tubes) related to the dispenser 101, the lubrication point 141, or the like. In at least one embodiment, the software may be in the form of an application (i.e., an "app").

A user of the second external device 150 may transmit information (e.g., using the application) to the dispenser 101 through the communication module 125. For example, the information may identify what type of lubricant and/or how much lubricant should be used at given lubrication points 141, certain times that the dispenser 101 is not to be operated (e.g., after 5 PM or before 8 AM), and the like. Once this information is obtained by the communication module 125, the information may be shown on the display 124. In another embodiment, the information may automatically change the settings of the dispenser 101. For example, the settings may be changed to dispense a particular type of lubricant and/or a particular amount of lubricant at the lubrication point 141, to limit the output pressure of the dispenser 101, and the like.

The communication module 125 may also be configured to transmit information to the second external device 150. For example, the information may include the amount of lubricant in the reservoir 114, the amount of lubricant in the chamber 106, the amount of lubricant that has been used (e.g., ejected through the fitting 116), the identity of the employee(s) using the dispenser 101 at a given time and/or location, the type of lubricant(s) used, a running tally of the total amount of lubricant used during a given time period (e.g., the user will know that employee "X" used "Y" numbers of grease tubes in "Z" days), the number of times and how often the dispenser 101 reached a stall condition (e.g., maximum pressure of the dispenser 101) to notify a manager, and the like. This information may be stored, for example, in the database of the second external device 150. The software may allow a user of the second external device 150 to manage the inventory and monitor the performance of the dispenser 101.

Instead of, or in addition to, the communication module 125, the dispenser 101 may include a universal serial bus ("USB") port 126 or the like. The USB port 126 may be part of, or in communication with, the controller 122. The USB port 126 may allow a user to communicate with the second external device 150 through a cable.

In at least one embodiment, second external device 150 may be configured to display to a user (e.g., the purchasing group) when the amount of lubricant in the inventory falls below a predetermined level so that more lubricant may be purchased or loaded into the dispenser 101. For example, a company may buy 300 tubes of grease. The dispenser 101 may communicate and update the inventory database when each tube is used (e.g., 299, 298, 297, etc. tubes remaining). When, for example, 5 tubes remain in the inventory, an alert may be sent to the purchasing department to order more tubes. Displaying when the amount of lubricant falls below a predetermined amount may be passive or may be active (e.g., sending a notification or alert).

In another embodiment, the second external device 150 may be configured to display when a user of the dispenser 101 is misusing the dispenser 101. For example, the user may misuse the dispenser 101 by stalling it during use, which may create a dangerous high-pressure situation. Displaying when the user is misusing the dispenser 101 may be passive or may be active (e.g., sending a notification or alert).

In operation of the system 100, the motor 102 drives the piston 104 up and down in the priming chamber 106. The speed of the motor 102 is set by the controller 122, as explained above. If the reservoir 114 is not empty, and the fitting 116 is not blocked, then the motor 102 driving the piston 104 on the upstroke may reduce a pressure in the priming chamber 106, thereby urging lubricant, or otherwise allowing lubricant to move, from the reservoir 114 and into the priming chamber 106. On the downstroke, the piston 104 may drive the lubricant through the outlet 117 and, e.g., through the fitting 116.

Further, the controller 122 may receive setpoint inputs entered by a user via the input 123 (and/or the display 124). The setpoints may be related to a rate at which lubricant is pumped from the reservoir 114 to the outlet 117. The controller 122 may convert these setpoints to speeds in the motor 102 and control the speed of the motor 102 accordingly. For example, the controller 122 may set a duty cycle based on the setpoint input, thereby varying the voltage applied to the motor 102.

Further, the controller 122 may receive a "meter reset" via the input 123, when the reservoir 114 is replaced or refilled, such that the controller 122 is informed of the amount of lubricant that is in the reservoir 114 (e.g., by volume, mass, weight, etc.). The amount of lubricant that the reservoir 114 contains may be preset (e.g., as according to provision of a new cartridge). Thus, the meter reset may proceed by pressing a reset button of the input 123, thereby re-establishing the amount of lubricant to the maximum. In another embodiment, the input 123 for the meter reset may be variable, such that the meter reset may proceed by entering a weight, volume, or other indicia of amount of lubricant in the reservoir 114. The controller 122 may also be programmed with data indicative of a dose amount (volume, mass, weight, etc.) of the lubricant. The dose amount may be equal to the amount of lubricant pumped by each cycle of the piston 104. For example, the dose amount may be equal to the maximum volume in the priming chamber 106 (i.e., with the piston 104 at the end of an upstroke), minus the minimum volume in the priming chamber 106 (i.e., with the piston 104 at the end of a downstroke).

Figure 2A:
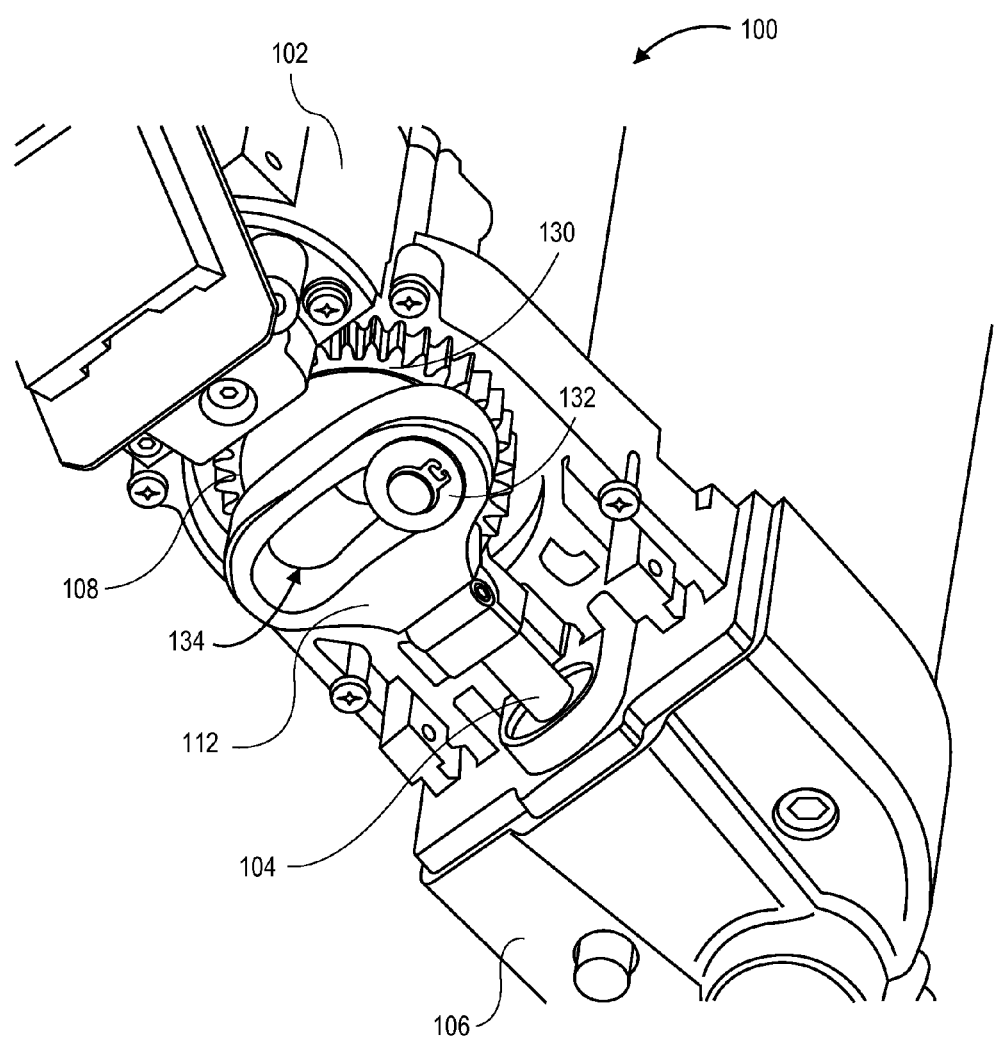
FIG. 2A illustrates a perspective view of a portion of the system, according to an embodiment.

FIG. 2A illustrates a perspective view of a portion of the system 100, according to an embodiment. As shown, the system 100 includes the linkage 108 and the yoke 112. The linkage 108 may include a gear 130 attached to a crank 132. The crank 132 may be received in a slot 134 formed in the yoke 112, such that rotation of the crank 132, as driven by the motor 102 via the gear 130 (and/or any other part of the linkage 108 or shaft 107 (FIG. 1)) pushes the piston 104 downwards and pulls the piston 104 upwards into and out of the priming chamber 106.

Figure 2B:
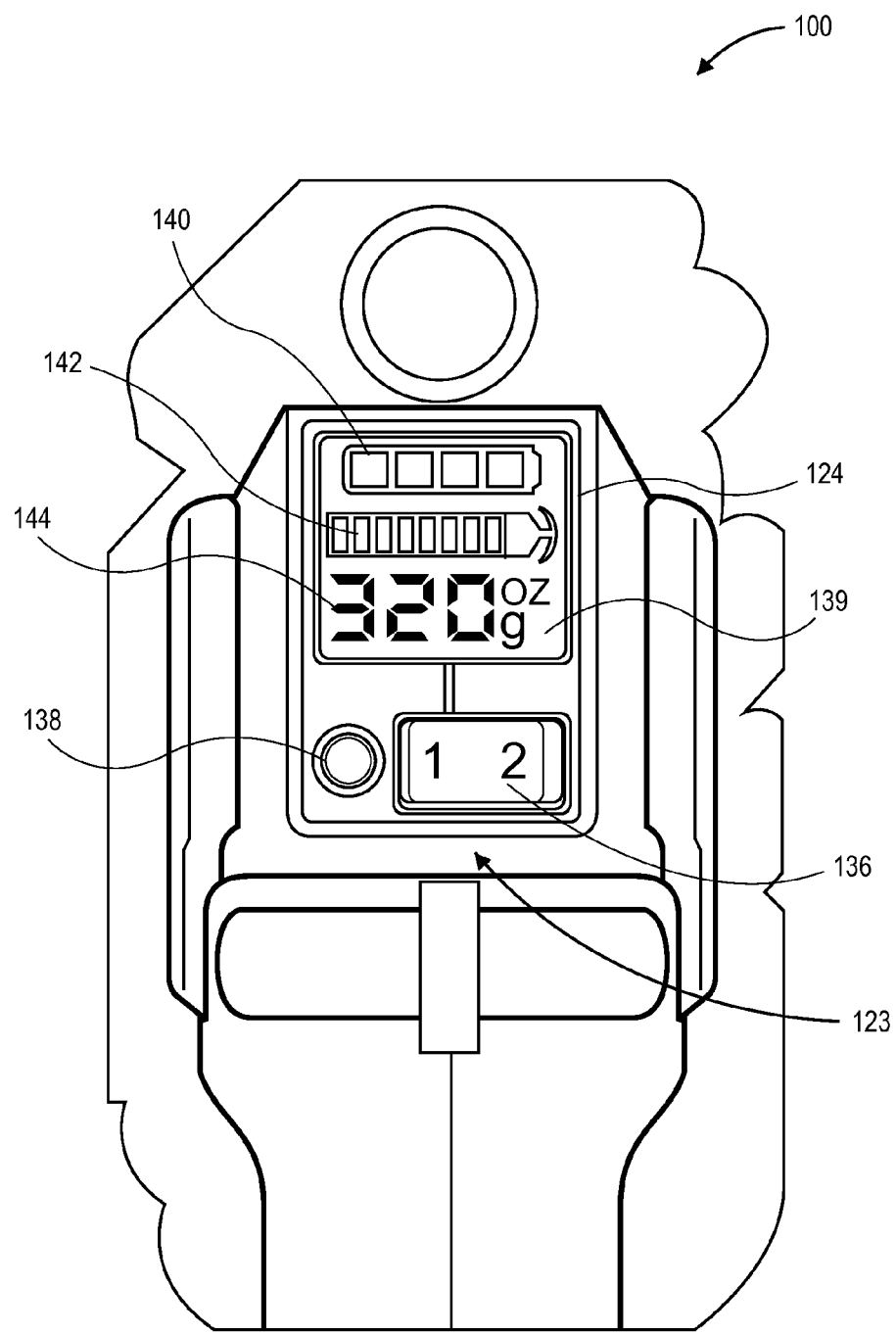
FIG. 2B illustrates a perspective view of a display and inputs of the system, according to an embodiment.

FIG. 2B illustrates a perspective view of the display 124 and the inputs 123, according to an embodiment. As shown, the inputs 123 are provided by a switch 136 and a button 138. The switch 136 may have, in one specific example, two positions, which may be labeled as shown. The switch 136 may thus indicate to the controller 122 (FIG. 1) the desired speed setpoint for the motor 102 (i.e., either setpoint "1" or setpoint "2"). Further, the button 138 may provide the meter reset, e.g., when a new cartridge for the reservoir 114 (FIG. 1) is inserted. In response to actuation (depressing) of the meter reset button 138, the controller 122 may reset the amount of lubricant used to zero, or reset the amount of lubricant available to the present amount, or both, reflective of a new, unused cartridge being provided. In other embodiments, either or both of the inputs 123 may be replaced by numerical inputs, such that a range of setpoints and/or a range of cartridge sizes for the meter reset may be provided.

The display 124 may include a screen 139, which may provide one or more indicators (three shown: 140, 142, 144) that may be employed to indicate one or more conditions of the system 100. For example, the indicator 140 may show a power status for the power supply 110 (FIG. 1). In embodiments in which the power supply 110 is a battery, the indicator 140 may indicate a remaining charge in the battery. Further, the indicator 142 may visually depict a fill level of the reservoir 114. For example, the indicator 142 may provide marks indicating the extent to which the reservoir 114 is filled. The marks may disappear, change color, move from filled in to empty, etc., in the indicator 142 as the lubricant from the reservoir 114 is removed by operation of the system 100. The indicator 144 may indicate a weight or mass for the remaining lubricant in the reservoir 114. Additional indicators representing other parameters of the system 100 may also be included, without limitation. Further, the screen 139 may also serve as an indicator, and may flash, change colors, etc. so as to provide an alarm, as will be described below.

Figure 3:
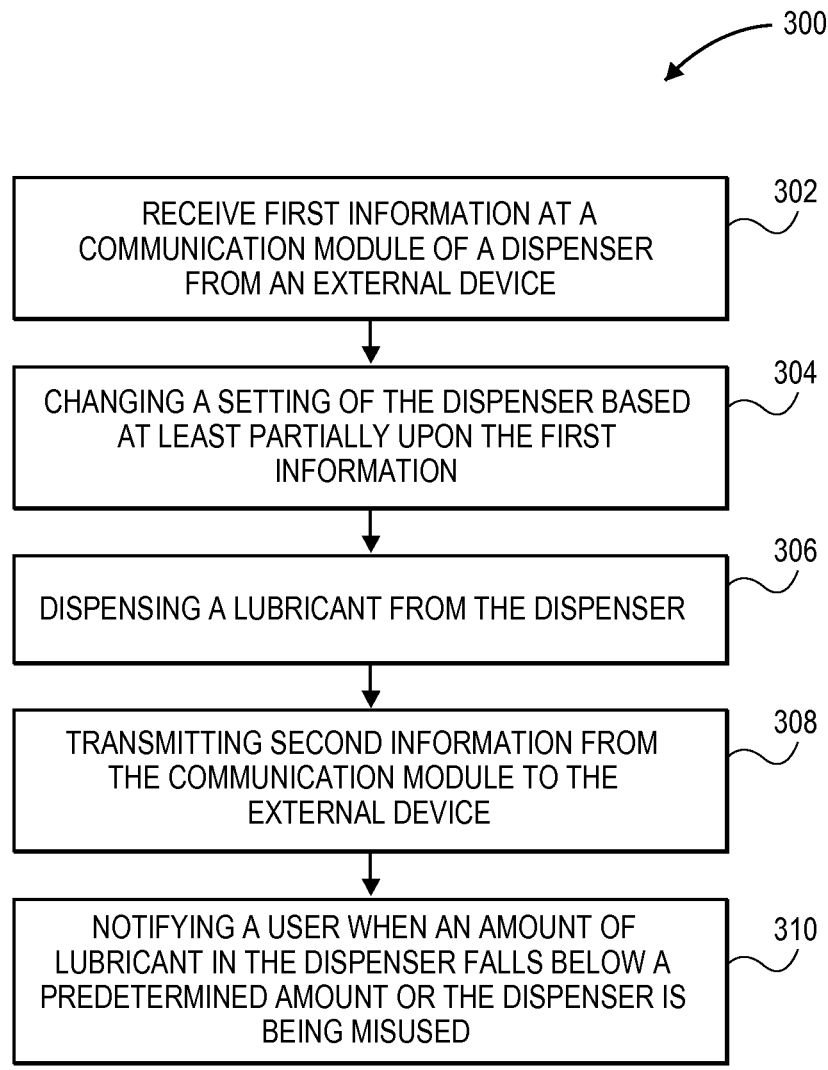
FIG. 3 illustrates a flowchart of a method for transmitting information between a dispenser and an external device, according to an embodiment.

With continuing reference to FIG. 1, FIG. 3 illustrates a flowchart of a method 300 for communicating between the dispenser and the external device(s), according to an embodiment. The method 300 may proceed by operation of an embodiment of the system 100, for example, and may thus be best understood with reference thereto. However, it will be appreciated that the method 300 is not limited to any particular structure unless otherwise stated herein. In addition, the steps below may be conducted in any order, and the order described below is for illustrative purposes only.

The method 300 may begin by receiving information at a communication module of a dispenser from an external device, as at 302. The information may be or include the type of lubrication point (e.g., bearing), the type of lubricant to be used at the lubrication point, the amount of lubricant to be used at the lubrication point, an output pressure of the dispenser, and the like. The external device may be or include an RFID tag positioned proximate to the lubrication point. In other embodiments, the external device may be or include a computer, a tablet, a smart phone, or the like. The information may be transmitted through a cable or wirelessly.

The method 300 may then continue to changing one or more settings of the dispenser based at least partially upon the information received from the external device, as at 304. The settings may be changed manually (e.g., by a user of the dispenser) or automatically upon receiving the information. The settings may be or include a particular type of lubricant and/or a particular amount of lubricant that is dispensed at the lubrication point, an output pressure of the dispenser, and the like.

The method 300 may then include dispensing a lubricant from the dispenser, as at 306. In at least one embodiment, the lubricant may be grease. The lubricant may be dispensed onto a lubrication point, which may on or proximate to a bearing, a track expansion, a windmill, or the like.

The method 300 may then include transmitting information to the external device or a different external device, as at 308. The information may include the amount of lubricant in the reservoir, the amount of lubricant in the chamber, the amount of lubricant that has been used (e.g., ejected through the fitting), the identity of the employee(s) using the dispenser at a given time and/or location, the type of lubricant(s) used, the output pressure of the dispenser, and the like. The information may be transmitted through a cable or wirelessly.

The method 300 may then include transmitting a notification (e.g., from the external device), or displaying the notification (e.g., on the external device), to a user, as at 310. The notification may alert the user when the amount of lubricant in the dispenser 101 falls below a predetermined level or when the dispenser is being misused.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An apparatus for dispensing a lubricant, comprising:
   a chamber having an inlet through which the lubricant is received and an outlet through which the lubricant is ejected;
   a controller in communication with the chamber; and
   a communication module in communication with the controller, wherein the communication module is configured to transmit first information to an external device, to receive second information from the external device, or both; and
   wherein the external device comprises a radio frequency identification tag positioned proximate to a bearing that is to receive the lubricant and the second information on the radio frequency identification tag is selected from the group consisting of:
   a type of the bearing;
   a type of the lubricant to be used on the bearing;
   an amount of the lubricant to be used on the bearing; and
   a maximum pressure not to be exceeded at a given lubrication point.

2. The apparatus of claim 1, wherein the lubricant comprises grease.

3. The apparatus of claim 1, wherein the external device comprises a computer, a tablet, or a smart phone.

4. The apparatus of claim 3, wherein the second information on the external device is selected from the group consisting of:
   a type of the bearing;
   a type of the lubricant to be used on the bearing; and
   an amount of the lubricant to be used on the bearing.

5. The apparatus of claim 3, wherein the first information on the communication module is selected from the group consisting of:
   an amount of the lubricant in the chamber;
   an amount of the lubricant that has been ejected through the outlet;
   a type of the lubricant;
   an identify of a user of the apparatus;
   a number of times that the apparatus stalls; and
   a frequency with which the apparatus stalls.

6. The apparatus of claim 1, wherein communication between the communication module and the external device is wireless.

7. The apparatus of claim 1, wherein the communication module comprises a USB port.

8. A system for dispensing a lubricant, comprising:
   a dispenser comprising:
   a chamber having an inlet through which the lubricant is received and an outlet through which the lubricant is ejected;

a piston movably positioned in the chamber;
a motor coupled with the piston and configured to move the piston in the chamber;
a controller in communication with the motor; and
a communication module in communication with the controller;
a first external device configured to transmit first information to the communication module; and
a second external device configured to transmit second information to the communication module, receive the second information from the communication module, or both; and
wherein the first external device comprises a radio frequency identification tag and the first information is selected from the group consisting of:
a type of the bearing;
a type of the lubricant to be used on the bearing; and
an amount of the lubricant to be used on the bearing.

9. The system of claim 8, wherein the second external device comprises a computer, a tablet, or a smart phone, wherein the second information is transmitted to the communication module, and wherein the second information is selected from the group consisting of:
the type of the bearing;
the type of the lubricant to be used on the bearing; and
the amount of the lubricant to be used on the bearing.

10. The system of claim 8, wherein the second external device comprises a computer, a tablet, or a smart phone, wherein the second information is received from the communication module, and wherein the second information is selected from the group consisting of:
an amount of the lubricant in the chamber;
an amount of the lubricant that has been ejected through the outlet; and
an identify of a user of the dispenser.

11. The system of claim 8, wherein the second external device comprises software configured to allow a user to manage an inventory of the lubricant, to monitor performance of the dispenser, or both.

12. A method for dispensing a lubricant, comprising:
receiving first information at a communication module of a dispenser from a first external device, wherein the dispenser comprises:
a chamber having an inlet through which the lubricant is received and an outlet through which the lubricant is ejected;
a piston movably positioned in the chamber;
a motor coupled with the piston and configured to move the piston in the chamber; and
a controller in communication with the motor and the communication module;
dispensing the lubricant from the dispenser to a lubrication point on a bearing: and
transmitting second information from the communication module to the first external device, wherein the second information is selected from the group consisting of:
an amount of the lubricant in the chamber;
an amount of the lubricant that has been ejected through the outlet; and
an identify of a user of the dispenser.

13. The method of claim 12, further comprising changing a setting of the dispenser based upon the first information received from the first external device.

14. The method of claim 12, further comprising transmitting second information from the communication module to a second external device, wherein the second information is selected from the group consisting of:
the type of the bearing;
the type of the lubricant to be used on the bearing; and
the amount of the lubricant to be used on the bearing.

15. The method of claim 12, further comprising notifying a user when an amount of the lubricant in the dispenser falls below a predetermined level or when the dispenser is being misused.

16. An apparatus for dispensing a lubricant, comprising:
a chamber having an inlet through which the lubricant is received and an outlet through which the lubricant is ejected;
a controller in communication with the chamber; and
a communication module in communication with the controller, wherein the communication module is configured to transmit first information to an external device, to receive second information from the external device, or both
wherein the external device comprises a computer, a tablet, or a smart phone and the second information on the external device is selected from the group consisting of:
a type of the bearing;
a type of the lubricant to be used on the bearing; and
an amount of the lubricant to be used on the bearing.

17. An apparatus for dispensing a lubricant, comprising:
a chamber having an inlet through which the lubricant is received and an outlet through which the lubricant is ejected;
a controller in communication with the chamber; and
a communication module in communication with the controller, wherein the communication module is configured to transmit first information to an external device, to receive second information from the external device, or both; and
wherein the external device comprises a computer, a tablet, or a smart phone and the first information on the communication module is selected from the group consisting of:
an amount of the lubricant in the chamber;
an amount of the lubricant that has been ejected through the outlet;
a type of the lubricant;
an identify of a user of the apparatus;
a number of times that the apparatus stalls; and
a frequency with which the apparatus stalls.

18. A method for dispensing a lubricant, comprising:
receiving first information at a communication module of a dispenser from a first external device, wherein the dispenser comprises:
a chamber having an inlet through which the lubricant is received and an outlet through which the lubricant is ejected;
a piston movably positioned in the chamber;
a motor coupled with the piston and configured to move the piston in the chamber; and
a controller in communication with the motor and the communication module; and
dispensing the lubricant from the dispenser to a lubrication point on a bearing; and
transmitting second information from the communication module to the first external device, wherein the second information is selected from the group consisting of:
the type of the bearing;
the type of the lubricant to be used on the bearing; and
the amount of the lubricant to be used on the bearing.

* * * * *